INVENTOR
Eugene A. Carsey

United States Patent Office 3,343,197
Patented Sept. 26, 1967

3,343,197
DUST COLLECTOR SYSTEM
Eugene A. Carsey, Cincinnati, Ohio, assignor to The Kirk & Blum Manufacturing Co., Cincinnati, Ohio, a corporation of Ohio
Filed Nov. 23, 1964, Ser. No. 413,201
1 Claim. (Cl. 15—301)

This invention relates to improvements in dust collector systems and is particularly directed to an all purpose, particulate collector system for manufacturing plants.

An object of the invention is to provide a dust collector system capable of collecting and disposing of all kinds and sizes of particulate material ranging from very light dust to heavy grinding powder or relatively heavy metal refuse, and the like.

Another object of the invention is to provide a system having the foregoing characteristics which ideally utilizes a high pressure, low volume stage that is interconnected in an existing low pressure, high volume dust collector.

A further object of the invention is to provide an all purpose factory particulate collecting system that will have a constant and fixed collecting characteristic, unlike present dust filter installations which become inefficient with continued use.

Other and further objects will be apparent from the following specification, taken in conjunction with the accompanying drawing, wherein.

Figure 1:
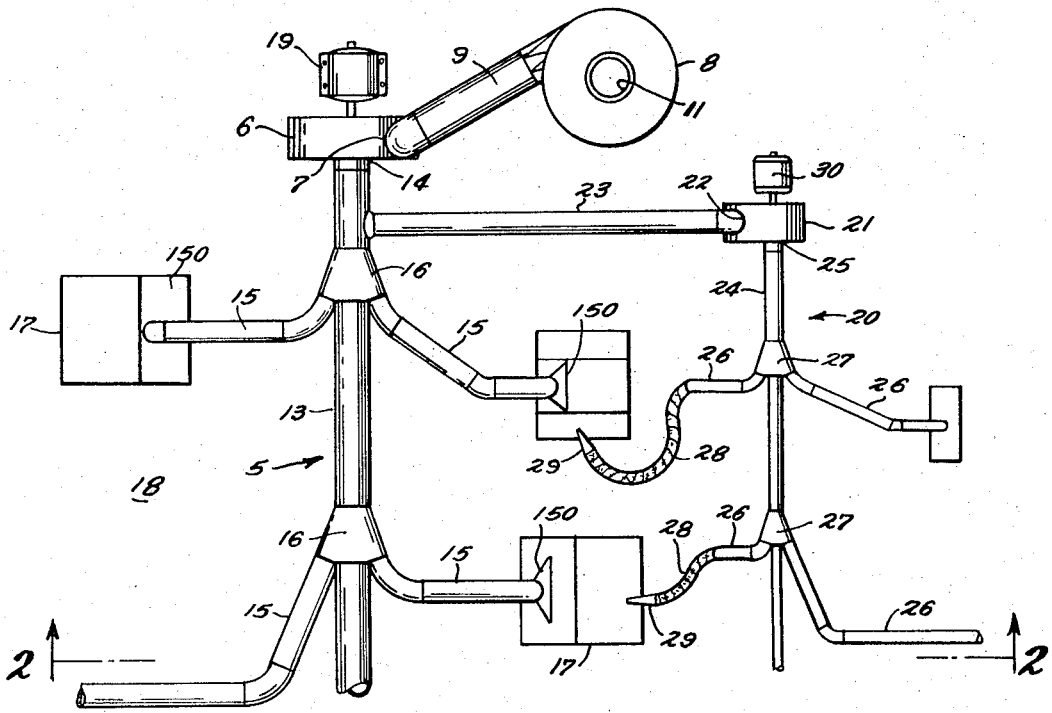
FIG. 1 is a top plan view of my system as applied to a factory floor layout.
Figure 2:
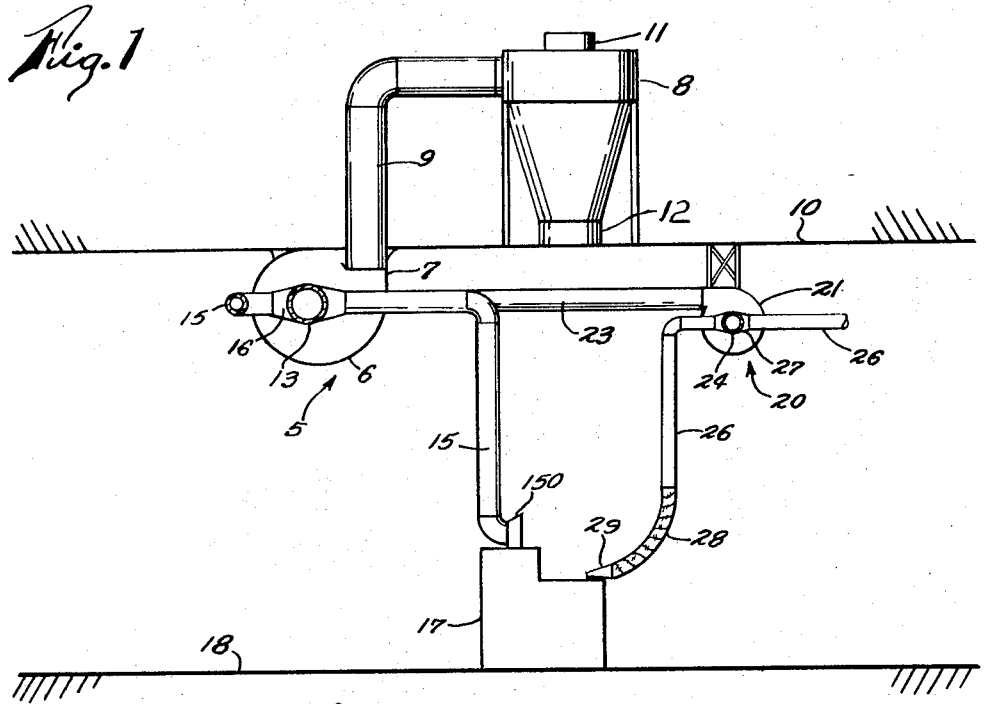
FIG. 2 is a section taken on line 2—2 of FIG. 1.

Referring to the drawings the reference numeral 5 indicates a high volume, low pressure dust collector served by a fan 6 which has its discharge side 7 connected to a centrifugal dust collector 8 by a pipe 9. The dust collector is of conventional design and is suitably located upon a factory roof 10, or the like, said collector receiving dust ladened air through pipe 9, discharging cleaned air to atmosphere through outlet 11; dust and particulate being collected in the bottom 12 for suitable disposition. A main exhaust duct 13 is connected to the inlet side 14 of the fan 6, said main exhaust duct having a number of branch pipes 15 connected thereto along its length by fittings 16. The terminal ends of the branch pipes 15 are connected to dust collecting shrouds or booths 150 which serve factory machines 17 located on the floor 18 of the manufacturing area.

The high volume, low pressure, dust collector 5 described hereinbefore is standard equipment in many present day factories, a typical fan 6 being driven by an electric motor 19 having a rating of 50 horsepower and adapted to move air through the main and discharge pipes at the rate of 20,000 cubic feet a minute and at a pressure of 9 inches of water on the hygrometer. The main duct 13 has an inside diameter of approximately 14 inches while each branch pipe 15 may have a diameter of approximate 7 inches. In practice the foregoing collector has been installed in many factories where dust collecting was the main objective; it being important to here note that the motor and pipe specifications are illustrative only and are given to show the relationship between said collector and my high pressure, low velocity particulate collector 20, the latter of which will now be described in detail. The particulate collector 20 is served by an auxiliary fan 21 which has its discharge side 22 connected into the main exhaust duct 13 of the dust collector 5 by a pipe 23. A stepdown exhaust pipe 24 is connected to the intake side 25 of the auxiliary fan 21 and has a number of branch pipes 26 connected thereto by fittings 27 located along said pipe 24. The ends of the branch pipes 26 may be connected to flexible hoses 28 which in turn have nozzles 29 on their ends having reduced air and particulate receiving openings therein.

The auxiliary fan 21 is driven by an electric motor 30 of relatively low horsepower, say three (3) horsepower, whilst the pipe 23 and the leading pipe 24 on the particulate collector are approximately 3 inches in diameter, the pipe 24 being reduced down to 2 inches in diameter as it recedes from the auxiliary fan 21. The branch pipes 26 and flexible hose 28 are two (2) inches in diameter whilst the nozzle opening is ⅛ inch in diameter whereby the intake speed of the nozzles is 15,000 cubic feet a minute; the velocity of air in the pipe 24 being 157 cubic feet a minute and having a pressure of 50 inches of water on the hygrometer.

It will therefore be understood that I have provided a low volume, high pressure material collector that is series staged with an existing high volume, low pressure dust collector which provides a fixed system characteristic for continuous plant operation and secures economies of installation in that the high pressure, low volume particulate collector may be series staged at any place along the main exhaust duct of a high volume, low pressure conventional dust collector.

Having thus described my invention what I claim as new is:

In a system of the class described including an existent high volume, low pressure dust and particulate material collector having a dust and particulate material transmitting main exhaust duct, branch pipes connected to said duct, said branch pipes having dust receiving hoods on their terminal ends, the improvement comprising a relatively high pressure, low volume particulate collector having a particulate material handling fan, a main exhaust pipe connected to the intake side of the fan, branch pipes connected into said main exhaust pipe along its longitudinal extent, each branch pipe having a relatively restricted, particulate entraining nozzle, and a particulate material transmitting pipe connecting the discharge side of the fan directly into the main exhaust duct of the existent high volume, low pressure dust and particulate material collector.

References Cited

UNITED STATES PATENTS

| 426,611 | 4/1890 | Allington | 302—27 X |
| 1,914,834 | 6/1933 | Otto | 15—377 X |
| 2,898,727 | 8/1959 | Bahnson | 15—301 X |

ROBERT W. MICHELL, *Primary Examiner.*